United States Patent [19]

Akram

[11] Patent Number: 4,471,170

[45] Date of Patent: Sep. 11, 1984

[54] NON-INTEGER PROGRAMMABLE COUNTER

[75] Inventor: M. Faheem Akram, Mesa, Ariz.

[73] Assignee: Motorola, Inc., Schaumburg, Ill.

[21] Appl. No.: 469,334

[22] Filed: Feb. 24, 1983

[51] Int. Cl.³ .............................................. H04M 1/26
[52] U.S. Cl. ................................. 179/84 VF; 340/348; 340/825.48; 340/825.74
[58] Field of Search ....................... 179/84 VF, 84 R; 375/59; 340/825.48, 825.74, 348, 345, 346

[56] References Cited

U.S. PATENT DOCUMENTS 4,061,886 12/1977 Callahan, Jr. et al. .......... 179/84 VF
4,110,567 8/1978 Boucher .......................... 179/84 VF Primary Examiner—Gene Z. Rubinson
Assistant Examiner—James L. Dwyer
Attorney, Agent, or Firm—William E. Koch

[57] ABSTRACT

An I²L non-integer programmable counter is provided that has a high frequency precision that uses feedback to adjust count length. A first divider adapted to receive a clock signal having a first frequency and an input signal, provide a signal having a second frequency substantially equal to the clock signal divided by a number. A second divider is coupled to the first divider for providing a stepped sine wave through a digital-to-analog converter. The first divider is responsive to both the input signal and feedback from the second divider so that the number may be a non-integer.

7 Claims, 3 Drawing Figures

NON-INTEGER PROGRAMMABLE COUNTER

BACKGROUND OF THE INVENTION

1. Field of the Invention

This invention relates, in general, to non-integer programmable counters and more particularly to an I²L programmable counter having a high frequency precision that uses feedback to adjust count length.

2. Background Art

Dual tone multifrequency (DTMF) dialers in telephone systems typically include a frequency generator or clock, a "divide-by-N" counter, a "divide-by-16" counter, a decoder, and a digital-to-analog (D/A) converter. The clock typically comprises a quartz crystal that produces a signal having a frequency of 3.5 megahertz. The "divide-by-N" counter divides the signal by some integer N to provide a signal having a frequency in the range desired. The "divide-by-16" counter provides the input to the D/A converter through a suitable decoder. The output of the D/A converter is a 16 stepped sine wave. One alternative approach is to use a 16 bit shift register in place of the "divide-by-16" counter, eliminating the need for a decoder, however, the result is the same.

These previously known DTMF dialers have certain disadvantages such as poor accuracy, relatively high current requirements, and high costs. These disadvantages make the previously known circuits less than desirable, for example, when the circuit is incorporated in an electronic telephone chip using I²L technology in order to operate at 1.1 volts.

Therefore, what is needed is a non-integer programmable counter where count length is varied to give a higher frequency precision, allowing for a less expensive input signal clock and having a reduced current requirement.

SUMMARY OF THE INVENTION

Accordingly, it is an object of the present invention to provide an improved programmable counter.

Another object of the present invention is to provide a programmable counter having higher frequency precision.

A further object of the present invention is to provide a programmable counter having reduced current requirements.

In carrying out the above and other objects of the present invention in one form, there is provided an improved programmable counter having a first divider adapted to receive a clock signal having a first frequency and a divider ratio signal. The first divider provides a first signal having a second frequency substantially equal to the first frequency divided by some number. A second divider is coupled to the first divider and provides a second signal having a third frequency. The first divider is responsive to feedback from the second divider so that the number may be changed during a portion of the period of the first signal.

The above and other objects, features, and advantages of the present invention will be better understood from the following detailed description taken in conjunction with the accompanying drawings.

DETAILED DESCRIPTION OF THE INVENTION

Conventional touch tone telephone systems have four rows and three columns of push-buttons, each row and column identified by a signal having a specific frequency generated for that row or column when the button is selected. For example, the number "1" on a telephone is in the first (upper) row and first (left) column and is identified by a frequency of 697 hertz for the first row and 1209 hertz for the first column. In actuality, a fourth column exists for the matrix but is not used on conventional telephone systems. The dual tone signal produced by pushing a button is detected at the "Telephone Central Exchange" and the number identified.

Figure 1:
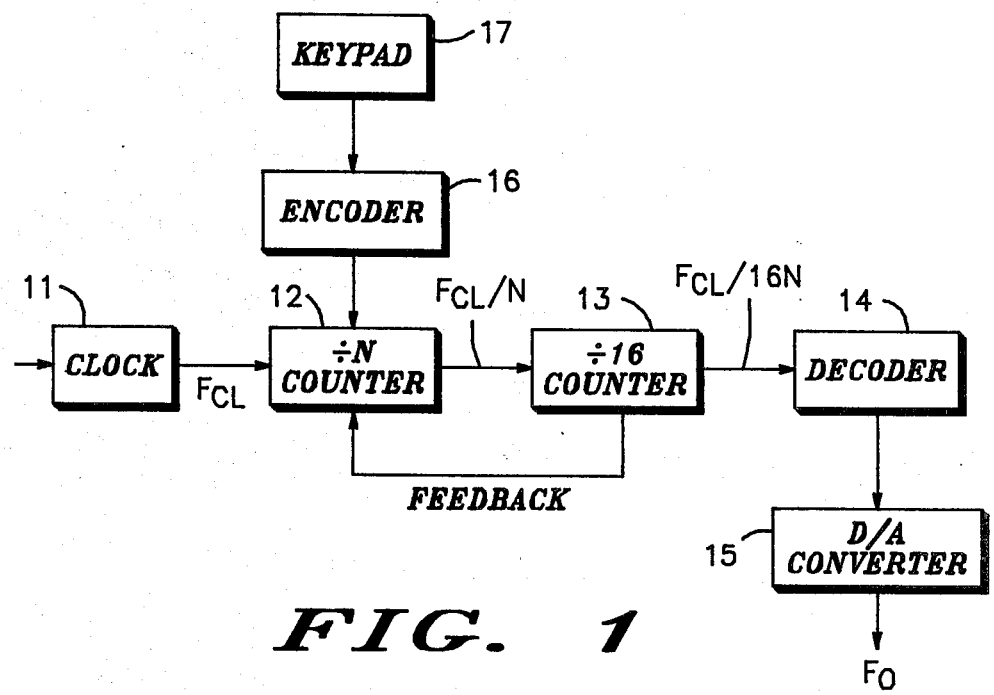
FIG. 1 is a block diagram of a dual tone multifrequency dialer incorporating the programmable counter of the present invention.
Figure 3:
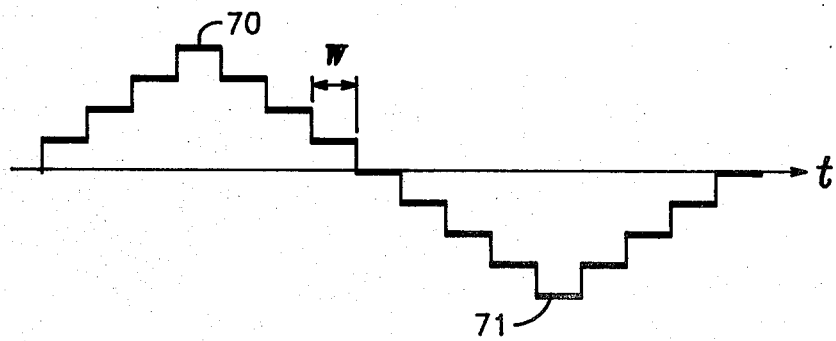
FIG. 3 is a waveform of the output signal of the present invention.

A dual tone multifrequency (DTMF) dialer for producing a sine wave signal having 16 steps representing any one of these frequencies is shown in FIG. 1. A clock 11 provides a clock signal to a divide-by-N counter 12. The divide-by-N counter 12 divides the clock signal by an integer N to provide a signal having a frequency in the range desired. A divide-by-16 counter 13 is connected to the divide-by-N counter 12. A feedback signal from divide-by-16 counter 13 is supplied to divide-by-N counter 12. A decoder 14 is connected to the divide-by-16 counter 13 and decodes the signal from the divide-by-16 counter 13. A digital-to-analog converter 15 is connected to the decoder 14 and produces a stepped sine wave which is illustrated in FIG. 3. Divide-by-N counter 12 is connected to keyboard encoder 16 which is connected to key pad 17. Key pad 17 is a four-by-four matrix of buttons, or switches, which may be push-buttons of a telephone. A signal from key pad 17 and, in turn, keyboard encoder 16, determines the value of "N" of divide-by-N counter 12.

Figure 2:
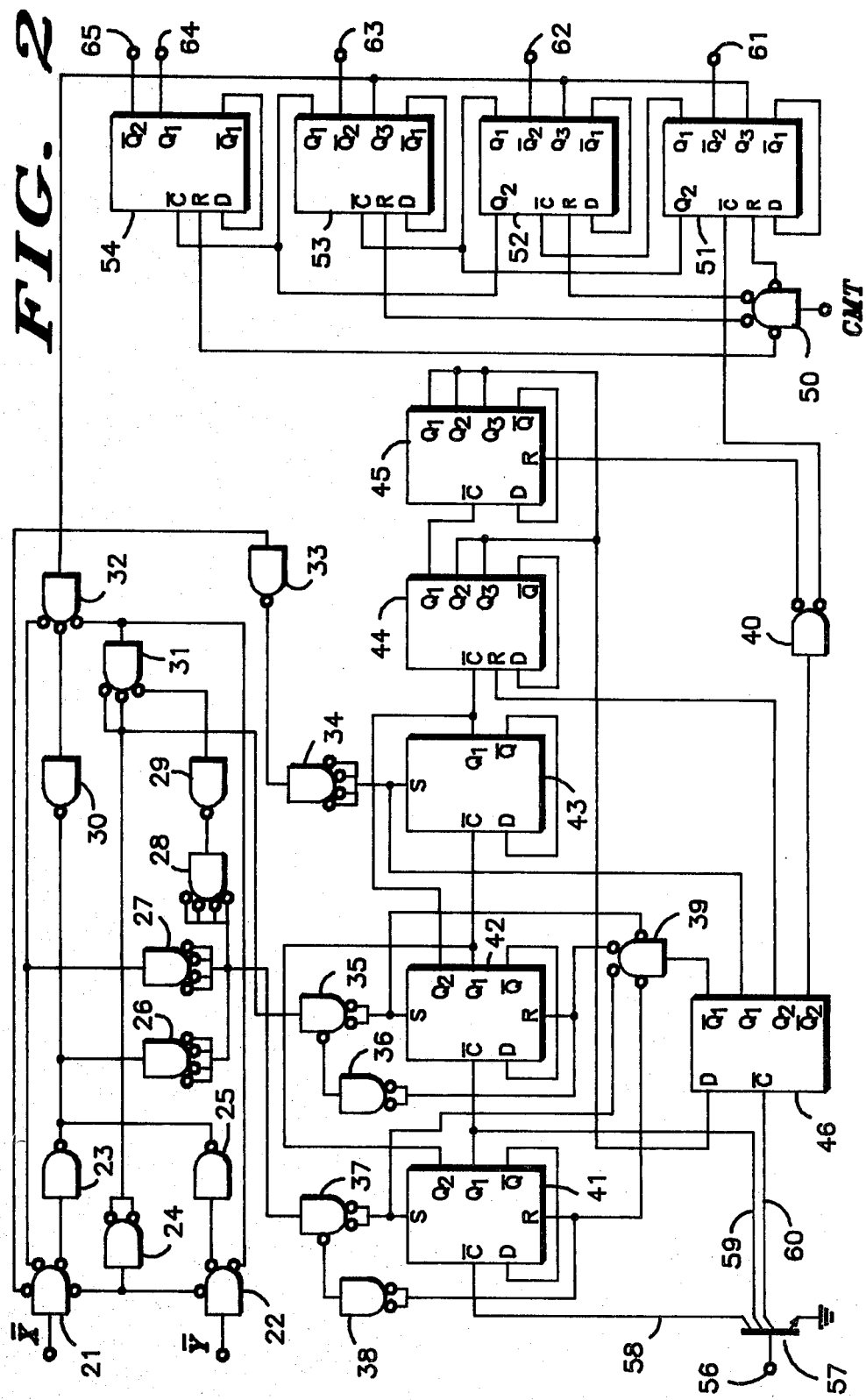
FIG. 2 is a schematic of the dividers of FIG. 1.

FIG. 2 illustrates divide-by-N counter 12 and divide-by-16 counter 13. Although the circuit shown is implemented in I²L technology, other technologies such as CMOS may be used. Logic gates 21, 22, 23, 24, 25, 26, 27, 28, 29, 30, 31, 32, 33, 34, 35, 36, 37, 38, 39, 40 and flip-flops 41, 42, 43, 44, 45, 46 comprise divide-by-N counter 12 and logic gate 50 and flip-flops 51, 52, 53, 54 comprise divide-by-16 counter 13. Terminal 56 receives the clock signal from clock 11 and is connnected to the base of multiple collector NPN transistor 57. Collectors 58, 59, 60 are connected to clock input $\overline{C}$ of flip-flops 41, 42, 46, respectively. The emitter of transistor 57 is connected to ground, for example, for pulling clock input $\overline{C}$ of flip-flops 41, 42, 46 low when a logic high from clock 11 is supplied to terminal 56.

Flip-flops 41, 42, 43, 44, 45 function as a ripple counter. Flip-flop 41 has output $Q_1$ connected to input $\overline{C}$ of flip-flop 42 and output $Q_2$ connected to input $\overline{C}$ of flip-flop 43. Flip-flop 42 has output $Q_1$ connected to input $\overline{C}$ of flip-flop 43 and output $Q_2$ connected to input $\overline{C}$ of flip-flop 44. Flip-flop 43 has output $Q_1$ connected to input $\overline{C}$ of flip-flop 44 and flip-flop 44 has output $Q_1$ connected to input $\overline{C}$ of flip-flop 45. Outputs $Q_2$, $Q_3$ of flip-flop 44 and outputs $Q_1$, $Q_2$, $Q_3$ of flip-flop 45 are connected to input D of holdover flip-flop 46. Although two and three outputs from flip-flops 44, 45, respectively, are illustrated for current requirements in this specific embodiment, the invention is not to be so limited. Each of flip-flops 41, 42, 43, 44, 45 has an output $\overline{Q}$ connected to input D, respectively.

Flip-flop 46 has output $Q_1$ connected to input S of flip-flop 43 and output $Q_2$ connected to input R of flip-flop 44. Output $\overline{Q}_1$ of flip-flop 46 is connected to the input of gate 39. Outputs of gate 39 are connected to input R and input S of flip-flops 41, 42. Output $\overline{Q}_2$ of flip-flop 46 is connected to the input of gate 40. Outputs from gate 40 are connected to input R of flip-flop 45 and input $\overline{C}$ of flip-flop 51. Gates 39 and 40 simply invert the signal applied to their inputs and may be eliminated by having additional Q outputs taken from flip-flop 46 instead of $\overline{Q}$ outputs as illustrated.

Gate 21 has an input adapted to receive divider ratio signal $\overline{X}$ and gate 22 has an input adapted to receive divider ratio signal $\overline{Y}$. Divider ratio signals $\overline{X}$ and $\overline{Y}$ are generated by keyboard encoder 16. Gate 23 has its input connected to one output of gate 21 and gate 25 has its input connected to one output of gate 22. Gate 24 has its input connected to one output from each of gates 21, 22. Gate 26 has its input connected to the output of gates 23, 25, 30. Gate 27 has its input connected to one output from each of gates 21, 32. Gate 28 has its input connected to the output of gate 29 and gate 29 has its input connected to one output of gate 31. Gate 30 has its input connected to one output of gate 32. Gate 31 has its input connected to one output from each of gates 22, 32. Gate 33 has its input connected to one output of gate 21 and gate 34 has its input connected to the output of gate 33. Gate 35 has its input connected to two outputs each of gates 24, 31. Gate 36 has its input connected to one output of gate 35. Gate 37 has its input connected to four outputs from each of gates 26, 27, 28. Gate 38 has its input connected to one output of gate 37. Gate 34 has four outputs connected to input S of flip-flop 43 and gate 35 has two outputs connnected to input S of flip-flop 42. Gate 36 has two outputs connected to input R of flip-flop 42. Gate 37 has two outputs connected to input S of flip-flop 41 and gate 38 has two outputs connected to input R of flip-flop 41.

Flip-flops 51, 52, 53, 54 of "divide-by-16" counter 13 each have its output $\overline{Q}_1$ connected to its input D, respectively. Flip-flop 51 has output $Q_1$ connected to input $\overline{C}$ of flip-flop 52, output $Q_2$ connected to input $\overline{C}$ of flip-flop 53, output $Q_3$ connected to the input of gate 32, and output $\overline{Q}_2$ connected to terminal 61. Flip-flop 52 has output $Q_1$ connected to input $\overline{C}$ of flip-flop 53, output $Q_2$ connected to input $\overline{C}$ of flip-flop 54, output $Q_3$ connected to the input of gate 32, and output $\overline{Q}_2$ connected to terminal 62. Flip-flop 53 has output $Q_1$ connected to input $\overline{C}$ of flip-flop 54, output $Q_3$ connected to the input of gate 32, and output $\overline{Q}_2$ connected to terminal 63. Outputs $Q_3$ from flip-flops 51, 52, 53 provided as an input to gate 32 is the feedback provided from "divide-by-16" counter 13 to "divide-by-N" counter 12. Flip-flop 54 has output $Q_1$ connected to terminal 64 and output $\overline{Q}_2$ connected to terminal 65. Gate 50 has its input adapted to receive input signal CMT and four outputs each connected to inputs R of each of flip-flops 51, 52, 53, 54. The outputs on terminals 61, 62, 63, 64, 65, are connected to the inputs of decoder 14.

In the previously known circuit described above, the "divide-by-N" counter (that does not receive feedback from the divide-by-16 counter), divides the clock frequency signal $F_{CL}$ by N. The output of the "divide-by-N" counter is further divided by 16 by the "divide-by-16" counter. Hence, the frequency fed to the decoder is $F_{CL}$ divided by 16N. The output of the decoder is applied to a digital-to-analog converter to produce a stepped sine wave approximation illustrated in FIG. 3 wherein the width W of each of the steps in the stepped sine wave is equal to N divided by $F_{CL}$. There are 16 steps per period of the output stepped sine wave. Previously known circuit design techniques allow only an integer to be used for N. Since both 16 and N are integers, it is seen that only those frequencies that are integrally related to $F_{CL}$ can be generated precisely by this previously known approach. In order to produce one of the DTMF frequencies, for example 1633 hertz, from a clock which has a frequency of 500 kilohertz, the clock frequency of 500 kilohertz must be divided by 16 times an N of 19. This would yield an output frequency of 1644.74 hertz, having an error of 0.72% from the desired 1633 hertz.

The programmable counter of the preferred embodiment described herein is loaded with a number $N_1$, such that $F_{CL}/16N_1$ is reasonably close to the desired output frequency $F_O$. The feedback from the "divide-by-16" counter determines when the output waveform is at a positive peak 70 or negative peak 71 (see FIG. 3), at which time, by way of this feedback connection, a number $N_2$ different from $N_1$ is loaded into the programmable counter. The effect is to increase or decrease the step width W so that the overall time period of the synthesized waveform is closer to the time period of $F_O$. Note that the step width W can be adjusted with a resolution equal to one clock. Adjusting the step width W at positive peak 70 and negative peak 71 has the following advantages. The incremental energy at the positive peak 70 and negative peak 71 is minimum, therefore, changing the step width W at these peaks contributes very little distortion. Second, rotation symmetry is maintained so that no even harmonics are generated.

The "divide-by-N" counter 12 and "divide-by-16" counter 13 shown in FIG. 2 generate the four column frequencies 1209 hertz, 1336 hertz, 1477 hertz, and 1633 hertz, depending on the state of the input signals $\overline{X}$ and $\overline{Y}$. The following table illustrates, for example, the precision obtainable with the new technique when a 500 kilohertz clock is used.

TABLE 1

| Column Frequency $F_C$ | $N_1$ | $N_2$ | Generated Frequency $F_O$ | % Error |
|---|---|---|---|---|
| 1209 Hz | 26 | 25 | 1207.73 Hz | −0.105% |
| 1336 Hz | 23 | 26 | 1336.89 Hz | −0.06% |
| 1477 Hz | 21 | 22 | 1479.28 Hz | +0.155% |
| 1633 Hz | 19 | 20 | 1633.98 Hz | +0.06% |

The first column of table 1 is the frequency desired for the output signal. The second and third columns illustrate the values for $N_1$ and $N_2$ respectively. Column 4 illustrates the frequency of output signal $F_O$ obtained and column 5 illustrates the error between the output frequency obtained and the desired output frequency. For 14 out of 16 steps of the output stepped sine wave, the programmable counter is loaded with $N_1$. For the remaining two steps which are at positive peak 70 and negative peak 71, the programmable counter is loaded with $N_2$. The generated frequency is equal to the clock frequency divided by the quantity $14N_1+2N$. The percent error is calculated by subtracting the column frequency from the generated frequency and dividing by the column frequency.

The "divide-by-16" counter 13 comprising flip-flops 51, 52, 53, 54 is in the reset mode if input signal CMT is a logic zero and in the count mode if input signal CMT is a logic 1. In the reset mode the Q outputs of flip-flips 51, 52, 53, 54 are zero. During normal operation of the programmable counter, input signal CMT is a logic 1. The Q outputs of flip-flops 51, 52, 53, 54 will then cycle through as illustrated in Table 2 for each negative going transition of the output of gate 40 as applied to clock input $\overline{C}$ of flip-flop 51.

TABLE 2

| Negative transition at C of FF-51 | Q outputs | | | |
|---|---|---|---|---|
| | FF-51 | FF-52 | FF-53 | FF-54 |
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |
| 10 | 0 | 1 | 0 | 1 |
| 11 | 1 | 1 | 0 | 1 |
| 12 | 0 | 0 | 1 | 1 |
| 13 | 1 | 0 | 1 | 1 |
| 14 | 0 | 1 | 1 | 1 |
| 15 | 1 | 1 | 1 | 1 |

For example, consider the generation of 1209 Hz. Keyboard encoder 16 would be required to generate a logic 1 for both divider ratio signals $\overline{X}$ and $\overline{Y}$ for the circuit as shown. Assuming that input signal CMT has just transitioned to a logic 1 and remains as such and also assuming output Q of flip-flop 46 is a logic 0, input signal R of flip-flops 44, 45 are zero, input S of flip-flop 43 is zero, and inputs R and S of flip-flops 41, 42 are zero. The clock input signal at terminal 56 is a square wave having a frequency of 500 kilohertz. The output of transistor 57 toggles flip-flop 41 and flip-flop 46, depending on the state of input D. Flip-flops 41, 42, 43, 44, 45 work as a ripple counter and when output Q (outputs $Q_1$ and $Q_2$ have the same logic state and for ease of description are collectively represented as output Q) of flip-flops 41, 42, 43, 44, 45 become 00011 respectively, input D to flip-flop 46 goes high. On the next clock pulse, output Q of flip-flops 41, 42, 43, 44, 45 become 10011 and output Q of flip-flop 46 becomes 1. $N_1$ or $N_2$ are then loaded into "divide-by-N" counter 12. As a result of output Q of flip-flop 46 being high, flip-flops 45, 46 are reset. Also, since input signal $\overline{Y}$ is 1, the output of gate 21 is low. This causes the output of gate 33 to go high and the output of gate 34 stay low. Therefore, output Q of flip-flop 43 stays low. Since output $\overline{Q}$ (outputs $\overline{Q}_1$ and $\overline{Q}_2$ have the same logic state and for ease of description are collectively represented as output Q) of flip-flop 46 is low, the output of gate 39 is high. Since the feedback to the input to gate 32 is low and the output of gate 32 is high and output of gate 22 is low, the output of gate 31 is high. The output of gate 24 is high because it has its input from gates 21, 22 which are both low. Therefore, the input to gate 35 is high and the output of gate 35 is low while the output of gate 36 is high. Therefore, flip-flop 42 is reset and causes output Q of flip-flop 42 to become a zero. The input to gate 27 is a wired AND connection between the output of gate 21 and gate 32. Since the output of gate 21 is zero, the output of gate 27 is one. Since the output of gate 31 is high, the output of gate 29 is low and the output of gate 28 is high. The input to gate 26 is a wired AND connection between the outputs of gates 23, 25, 30. Since the feedback to the input to gate 32 is low, this causes the input of gate 30 to be high and the output of gate 30 to be low. Thus, the wired AND connection to gate 26 input is low which causes the output of gate 26 to be high. The input to gate 37 is the wired AND connection between the outputs of gates 26, 27, and 28 which are high. Therefore, the output of gate 37 is low and that of gate 38 is high. This causes output Q of flip-flop 41 to go low. Thus, the outputs of flip-flops 41, 42, 43, 44, 45 have been changed from 10011 to 00000. The binary representation of the decimal digit 25 is 10011 and the binary representation of decimal digit 0 is 00000. Thus, the decimal digit 0 has been loaded into the divide-by-N counter comprising flip-flops 41, 42, 43, 44, 45. Since the counter is now in the state 00000, input D to flip-flop 46 goes low. Thus, on the next clock pulse output Q of flip-flop 46 goes low. Note that this clock pulse does not toggle flip-flops 41, 42, 43, 44, 45 because output Q of flip-flop 46 was high and it forced flip-flop 41 to be reset. The most recent clock pulse has caused output Q of flip-flop 46 to go low, thereby causing inputs R and S of flip-flops 41, 42, 43, 44, 45 to go low whereby subsequent pulses will toggle flip-flops 41, 42, 43, 44, 45. On this last pulse, the output of gate 40 also transitioned to a zero. Thus, flip-flops 51, 52, 53, 54 are toggled every time flip-flop 46 transitions from a logic high to a logic low.

On subsequent pulses of clock signal $F_{CL}$, flip-flops 41, 42, 43, 44, 45 will count from state 00000 (decimal digit 0) to state 10011 (decimal digit 25), thus having counted 25 pulses and at which time output Q of flip-flop 46 will become a logic one as previously described. On the next clock pulse, output Q of flip-flop 46 transitions to zero and also toggles flip-flops 51, 52, 53, 54. Thus, flip-flops 51, 52, 53, 54 are toggled every 26th clock pulse. In other words, flip-flops 41, 42, 43, 44, 45, 46 comprise a "divide-by-26" counter. Now, for each 26 pulses, flip-flops 51, 52, 53, 54 are toggled by unit increments until the outputs Q of flip-flops 51, 52, 53 are all logic ones. Then, the feedback to the input to gate 32 becomes a logic 1 and when output Q of flip-flop 46 (the next load cycle) becomes 1, flip-flop 41 will be set and flip-flops 41, 42, 43, 44, 45, 46 will be loaded with binary digit 10000. Since 10000 is a decimal digit 1, when output Q of flip-flop 46 becomes a zero after the next clock pulse, flip-flops 41, 42, 43, 44, 45 will count from 10000 (decimal 1) to 10011 (decimal 25) or 24 pulses. Output Q of flip-flop 46 will then become 1 as previously described. The next pulse causes output Q of flip-flop 46 to go low and flip-flops 51, 52, 53, 54 are toggled. Thus, flip-flops 51, 52, 53, 54 were toggled after 25 pulses. The feedback to the input to gate 32 then becomes 0 and the operation of flip-flops 41, 42, 43, 44, 45 resumes its normal operation of division by 26. Referring to Table 2, it may be seen that in cycling through the full table, the outputs Q of flip-flops 51, 52, 53 become a logic 1 twice. Thus, for two of the sixteen states, flip-flops 41, 42, 43, 44, 45 divide by 25 and for the remaining 14 states divide by 26. In other words, "divide-by-N" counter 12 divides by 26(14/16)+25(2/16) or 25.875. Thus, a division by a non-integer number has been accomplished and since this division ratio may be changed, the counter is programmable. Therefore, output FCL/N of "divide-by-N" counter 12 is 500 KHZ/25.875, or 19.32 KHZ. Output $F_{CL}/16N$ of "divide-by-16" counter 13 is then 1207.73 HZ.

By now it should be appreciated that there has been provided an improved programmable counter having a high frequency precision that utilizes feedback to adjust count length.

I claim:

1. A non-integer programmable counter comprising:
    a first divider adapted to receive a clock signal having a first frequency and to receive a programmable divider ratio signal, for providing a first signal having a second frequency substantially equal to said first frequency divided by a number, said first signal having a period including at least two portions; and
    a second divider coupled to said first divider for providing a second signal having a third frequency, said first divider responsive to a feedback signal from said second divider so that said number may be changed during at least one of said portions.

2. The programmable counter according to claim 1 wherein said first divider comprises:
    a plurality of flip-flops interconnected and responsive to said clock signal for providing said first signal; and
    a logic means coupled to said plurality of flip-flops and responsive to said divider ratio signal and said feedback signal for controlling at least a portion of said plurality of flip-flops.

3. The programmable counter according to claim 2 wherein said second divider comprises a plurality of flip-flops interconnected.

4. A dual tone multifrequency dialer for a telephone including a dialing means for sequentially identifying decimal digits, comprising:
    a clock for providing a clock signal having a clock frequency;
    encoder means coupled to said dialing means for providing a divider ratio signal;
    a first counter coupled to said clock and said encoder means for providing a first counter output having a frequency substantially equal to said clock frequency divided by a first number;
    a second counter coupled to said first counter for providing a second counter output having a frequency substantially equal to said first counter output divided by a second number, said first counter being responsive to feedback from said second counter wherein said first number is varied to change said frequency of said first counter output;
    a decoder coupled to said second counter for decoding said second counter output; and
    a digital-to-analog converter coupled to said decoder for providing a stepped sine wave output.

5. The dual tone multifrequency dialer according to claim 4 wherein said first divider comprises:
    a plurality of flip-flops interconnected and responsive to said clock signal for providing said first counter output; and
    logic means coupled to said plurality of flip-flops and responsive to said divider ratio signal and said feedback for controlling at least a portion of said plurality flip-flops.

6. The dual tone multifrequency dialer according to claim 5 wherein said second counter comprises a plurality of interconnected flip-flops.

7. A method of dividing the frequency of a first signal, comprising the steps of:
    dividing the frequency of the first signal by a first number within a first divider to obtain a second signal;
    dividing the frequency of the second signal by a second number within a second divider; and
    providing feedback from the second divider to the first divider whereby the first number is varied within the period of the first signal.

* * * * *

UNITED STATES PATENT AND TRADEMARK OFFICE
CERTIFICATE OF CORRECTION

PATENT NO. : 4,471,170
DATED : September 11, 1984
INVENTOR(S) : M. Faheem Akram

It is certified that error appears in the above-identified patent and that said Letters Patent is hereby corrected as shown below:

Column 8, claim 5, line 9; before "flip-flops" insert
--of--.

Signed and Sealed this

Second Day of April 1985

[SEAL]

Attest:

DONALD J. QUIGG

Attesting Officer     Acting Commissioner of Patents and Trademarks